United States Patent [19]

Asano et al.

[11] Patent Number: 4,492,472
[45] Date of Patent: Jan. 8, 1985

[54] METHOD AND SYSTEM FOR DETERMINING SHAPE IN PLANE TO BE DETERMINED IN ATMOSPHERE OF SCATTERING MATERIALS

[75] Inventors: Yuichiro Asano, Chiba; Akira Hirahashi, Kobe; Suehisa Ohga, Takarazuka; Tadashi Yabe; Kunio Kurita, both of Chiba; Atsushi Momose, Takarazuka, all of Japan

[73] Assignee: Kawasaki Steel Corporation, Kobe, Japan

[21] Appl. No.: 399,847

[22] Filed: Jul. 19, 1982

[30] Foreign Application Priority Data

Jul. 27, 1981 [JP] Japan .................................. 56-117247
Jul. 27, 1981 [JP] Japan .................................. 56-117249

[51] Int. Cl.³ .................................................. C21B 7/24
[52] U.S. Cl. .................................. 356/376; 250/563; 356/394
[58] Field of Search .................. 356/1, 4, 376, 390, 356/394; 250/563, 572; 358/166, 167

[56] References Cited

U.S. PATENT DOCUMENTS

| | | | |
|---|---|---|---|
| 3,546,377 | 12/1970 | Troll | 356/394 |
| 3,909,602 | 9/1975 | Micka | 356/394 |
| 4,171,917 | 10/1979 | Pirlet | 356/376 |
| 4,274,747 | 6/1981 | Van Beeck et al. | 250/563 |
| 4,315,771 | 2/1982 | Bobillon | 356/376 |
| 4,323,973 | 4/1982 | Greenfield | 358/166 |

Primary Examiner—R. A. Rosenberger
Attorney, Agent, or Firm—Parkhurst & Oliff

[57] ABSTRACT

The invention relates to a method for determining the shape in a plane to be determined in atmosphere of scattering materials. The method includes comprising the steps of irradiating light on a first line to be determined being imaged on the plane to be determined in the atmosphere of scattering materials to extract a first picture signal at the time of picking up the first line to be determined; at the same time, irradiating light on a second line to be determined being imaged at a position with a prescribed distance apart from the first line to be determined to extract a second picture signal at the time of picking up the second line to be determined; then, subtracting the second picture signal from the first picture signal to extract a fresh picture signal; and operating two-dimensional position coordinates of a first image of line to be determined on the picture in which the first line to be determined has been picked up on the basis of the fresh picture signal to extract three-dimensional position coordinates of the first line to be determined in the plane to be determined through coordinate conversion of the two-dimensional position coordinates. Further, the invention relates to a system in which the scattering materials are cleared away by jetting gas into the atmosphere of scatttering materials prior to picking up of the lines to be determined.

8 Claims, 25 Drawing Figures

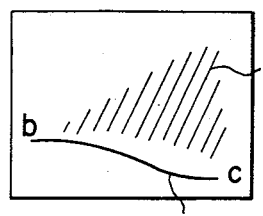
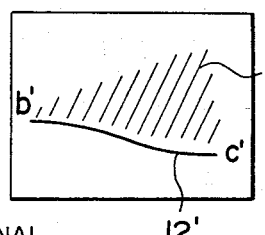
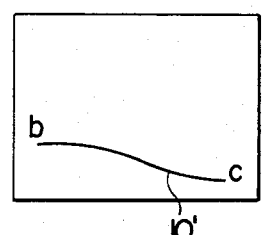
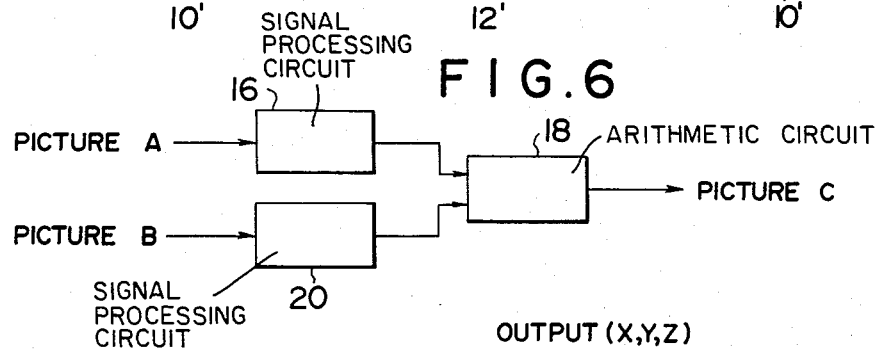
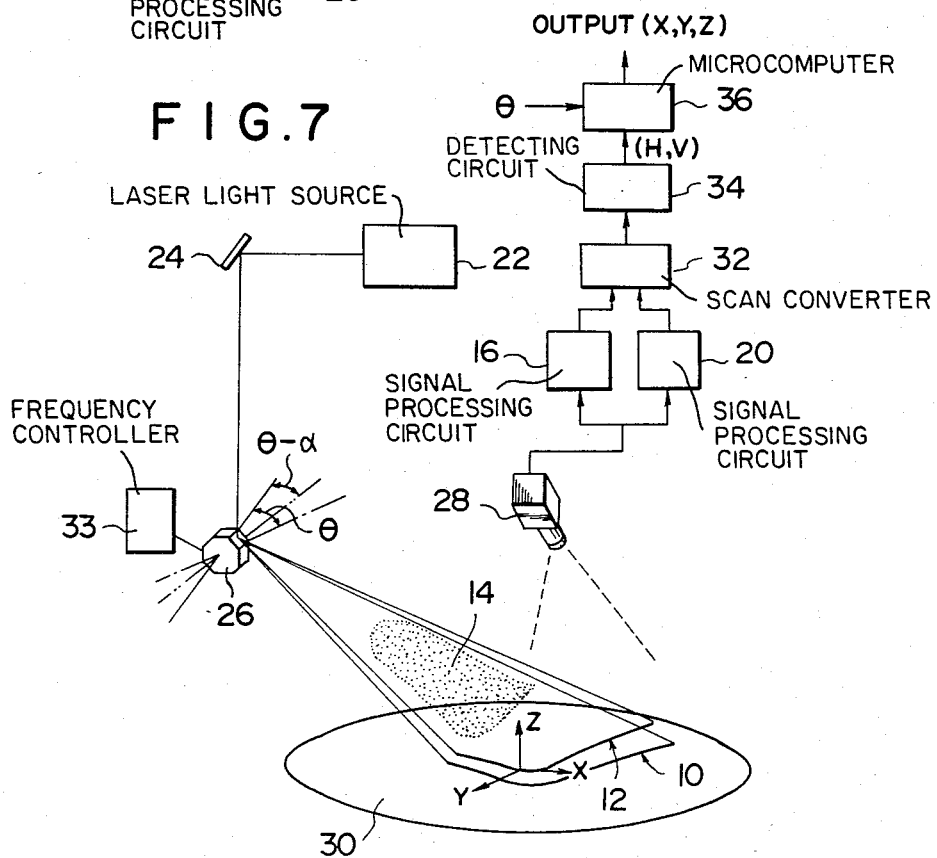

FIG.13
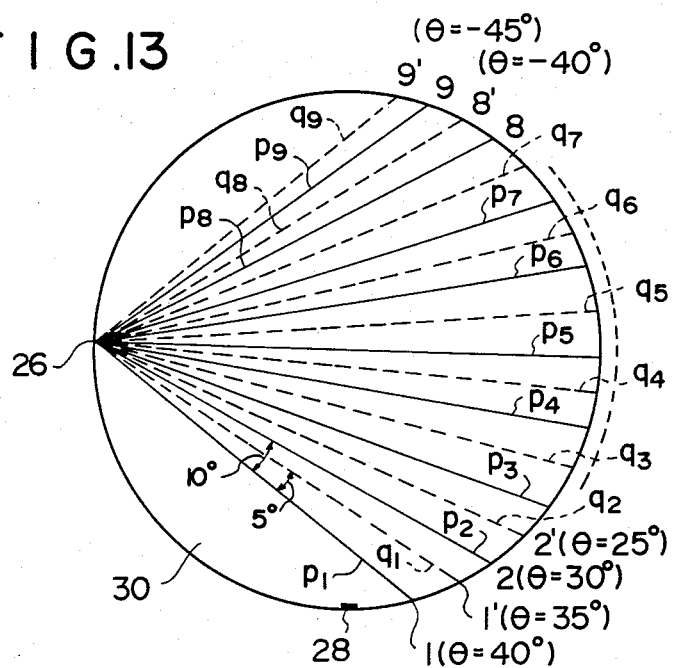
FIG.14
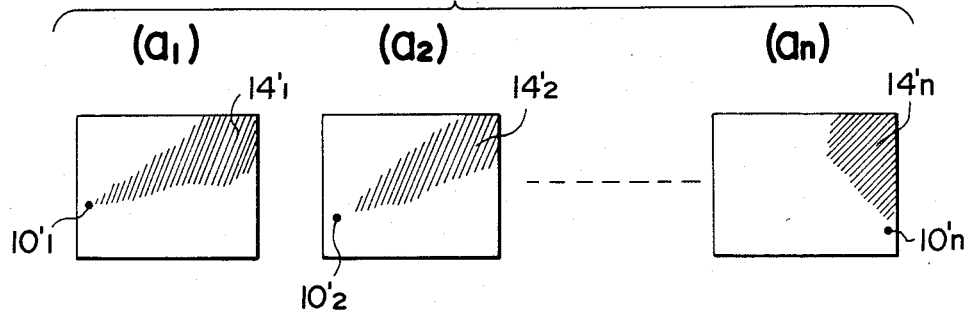
FIG.15　　FIG.16　　FIG.17
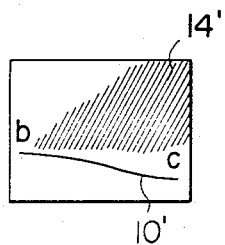 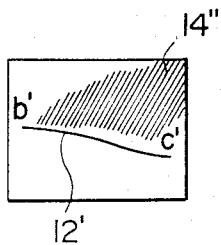 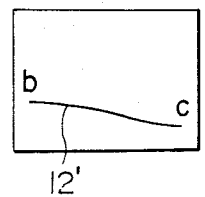

METHOD AND SYSTEM FOR DETERMINING SHAPE IN PLANE TO BE DETERMINED IN ATMOSPHERE OF SCATTERING MATERIALS

BACKGROUND OF THE INVENTION

1. Field of the Invention

The present invention relates to a method and system for determining the shape in a plane to be determined in atmosphere of scattering materials. More particularly the present invention relates to a method for determining the shape in a plane to be determined to which light-section method is applied in such atmosphere where scattering materials such as dust, mist and the like float as in the case of the interior of the top of a blast furnace.

2. Description of the Prior Art

Heretofore, light-section method has been known as a method for determining a position, shape, dimension, displacement and the like of an object to be determined. In the case of determining the shape in a plane to be determined by utilizing such light-section method, the operation is carried out, as illustrated in FIG. 1, in accordance with such manner that a projector 2 and a pick up means 4 are employed, light is irradiated on a line 8 to be determined being imagined on a plane 6 to be determined by means of the projector 2, the line 8 to be determined is picked up by means of the pickup means 4, and the shape in the plane to be determined is obtained on the basis of the picture picked up. More specifically, first, either a certain plane (light cut section) a b c is scanned by means of light beam emitted from a point a in the projector 2 at a prescribed rate, or belt-like light rays are irradiated onto such certain plane to illuminate the line 8 to be determined, and the line 8 is picked up by utilizing the pickup means 4 placed outside the certain plane a b c. The line 8 to be determined is picked up as an image of light locus in the case where scanning is effected with light beam, whilst the line 8 is picked up as a luminance line image along the line to be determined in the case where belt-like light rays are irradiated. Then, two-dimensional position coordinates of the respective points of an image of line to be determined on the picture picked up are extracted, and further three-dimensional position coordinates in the respective points of the line to be determined on the plane to be determined are extracted from the resulting two-dimensional position coordinates and a geometrical arrangement defined by the certain plane a b c and the pickup means by means of coordinate conversion. Furthermore a plurality of lines to be determined are imagined on the plane 6 to be determined, light is irradiated on the respective lines to be determined by varying an azimuth of the certain plane a b c, and three-dimensional position coordinates in the respective points of the respective lines to be determined in accordance with a similar manner to that mentioned above. Then, when enveloping surface is extracted from these three-dimensional position coordinates, the shape in the plane to be determined can be obtained.

However, since such light-section method utilizes light, if environmental condition of such determination is in atmosphere of scattering materials, there arises such disadvantage that a part of the light projected on the plane to be determined is scattered by floating scattering materials, and when the line to be determined is picked up in this condition, a background picture (image of scattered light) is picked up other than the image of line to be determined. Thus, there arise such problems in that such background picture changes its distribution of luminance in response to the change in a distribution of spatial and time concentration of scattering materials, and generation of such background picture results in deterioration in SN ratio of the image of line to be determined, very difficult detection, or such a case where the background picture is erroneously detected as the image of line to be determined. When these phenomena are described in conjunction with a blast furnace, there cause such problems that laser beam does not reach the plane to be determined, and that picking up of luminous spots or luminous lines on the plane to be determined becomes difficult in the case where a dust density is very high either immediately after charging a raw material into the blase furnace in which a Bell type charging means is utilized, or during charging of the raw material into the blast furnace in which a Bell-less type charging means is employed.

Moreover, in the case when a profile in the stock surface of charge in the top of a blast furnace is determined, emission from the core of the furnace frequently occurs, such emission is picked up as a passive image, such passive image functions similarly to the case of the above-mentioned background picture so that there arise similar problems to those as mentioned above.

SUMMARY OF THE INVENTION

The present invention has been made to solve the above described problems. Accordingly, an object of the present invention is to provide a method for determining the shape in a plane to be determined in atmosphere of scattering materials by which the shape in the plane to be determined can favorably be determined even in an unfavourable environmental condition in which background picture and emission exist.

Furthermore, another object of the present invention is to provide a system for determining the shape in a plane to be determined in atmosphere of scattering materials by which the shape in the plane to be determined can be determined even in the atmosphere of scattering materials such as dust, mist and the like without being unfavorably affected by such scattering materials.

The above described objects are attained by the present invention relating to a method for determining the shape in a plane to be determined in atmosphere of scattering materials comprising the steps of irradiating light on a first line to be determined being imagined on the aforesaid plane to be determined in the atmosphere of scattering materials to extract a first picture signal at the time of picking up the aforesaid first line to be determined; at the same time, irradiating light on a second line to be determined being imagined at a position with a prescribed distance apart from the aforesaid first line to be determined to extract a second picture signal at the time of picking up the aforesaid second line to be determined; then, subtracting the aforesaid second picture signal from the aforesaid first picture signal to extract a fresh picture signal; and operating two-dimensional position coordinates of a first image of line to be determined on the picture in which the aforesaid first line to be determined has been picked up on the basis of the aforesaid fresh picture signal to extract three-dimensional position coordinates of the aforesaid first line to be determined in the aforesaid plane to be determined through coordinate conversion of the aforesaid two-dimensional position coordinates.

Moreover, the above-mentioned objects are attained by the present invention relating to a method for determining the shape in a plane to be determined in atmosphere of scattering materials comprising the steps of extracting a first picture signal at the time when a first line to be determined being imagined on the aforesaid plane to be determined in the atmosphere of scattering materials is picked up by scanning the aforesaid first line to be determined with light beam having a prescribed rate; at the same time, extracting a second picture signal at the time when a second line to be determined being imagined at a position with a prescribed distance apart from the aforesaid first line to be determined is picked up by scanning said second line to be determined with light beam having a higher scanning rate than the aforesaid prescribed scanning rate; then, subtracting the aforesaid second picture signal from the aforesaid first picture signal to extract a fresh picture signal; and operating two-dimensional position coordinates of a first image of line to be determined on the picture in which the aforesaid line to be determined has been picked up on the basis of the aforesaid fresh picture signal to extract three-dimensional position coordinates of the aforesaid first line to be determined in the aforesaid plane to be determined through coordinate conversion of the aforesaid two-dimensional position coordinates. In this case, it is preferable that the aforesaid prescribed scanning rate of light beam with which the aforesaid first line to be determined is scanned has a magnitude satisfying such a condition that a rate of a luminous spot image on a picture corresponding to luminous spots on the aforesaid first line to be determined is equal to or less than a ratio of a diameter of the aforesaid luminous spot image on the picture to a period of scanning the picture; and the aforesaid scanning rate of light beam with which the aforesaid second line to be determined is scanned has a magnitude satisfying such a condition that a time for passing the aforesaid luminous spot image through the surface of the aforesaid picture is equal to or shorter than the aforesaid period of scanning the picture.

In addition, the above stated objects are attained by the present invention relating to a system for determining the shape in a plane to be determined in atmosphere of scattering materials comprising a projector for projecting light upon a line to be determined being imagined on a plane to be determined in atmosphere of scattering materials; a gas jetting means for jetting gas of a higher pressure than that of the aforesaid atmosphere of scattering materials thereinto; a pickup means for picking up the aforesaid line to be determined after jetting the aforesaid gas by means of the aforesaid gas jetting means, thereby to output a picture signal; a position coordinate detection circuit for extracting two-dimensional position coordinates of a line to be determined on a picture from the aforesaid picture signal outputted from the aforesaid pickup means; and an arithmetic unit for operating three-dimensional position coordinates of the aforesaid line to be determined on the aforesaid plane to be determined by subjecting the aforesaid two-dimensional position coordinates extracted by means of the aforesaid position coordinate detection circuit to coordinate conversion. In accordance with the construction as mentioned above, dust-free gas is jetted from the gas jetting means to clear away the scattering materials on light path in the case where a line to be determined is picked up by means of the pickup means and as a result, a plane to be determined can be picked up without being unfavorably affected by the scattering materials.

Therefore, according to the present invention, such an excellent advantage that a shape of the plane to be determined can favorably be determined even in atmosphere of scattering materials.

BRIEF DESCRIPTION OF THE DRAWINGS

The above-mentioned features and objects of the present invention will become more apparent by reference to the following description taken in conjunction with the accompanying drawings, wherein like referenced numerals denote like elements, and in which:

FIGS. 3 through 5, inclusive, are diagrams illustrating picture A, picture B and picture C in the principle of the present invention, respectively;

FIG. 6 is a block diagram illustrating a circuit for extracting picture C from picture A and picture B in the aforesaid present invention;

FIG. 7 is a block diagram illustrating an embodiment in the case when the present invention is applied to a determination of the surface of charge in a furnace;

FIG. 13 is a diagram showing lines to be determined being imagined in the case when the whole surface of charge in a furnace is determined in the embodiment of the present invention;

FIGS. 14 through 17, inclusive, are diagrams each illustrating a picture in the principle of the present invention;

DESCRIPTION OF THE PREFERRED EMBODIMENTS

Figure 1:
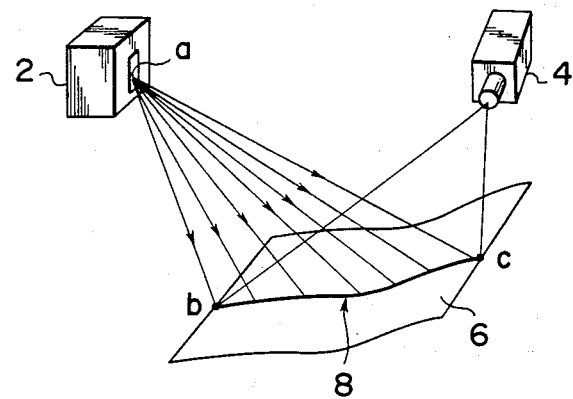
FIG. 1 is an explanatory view for explaining a conventional light-section method.
Figure 2:
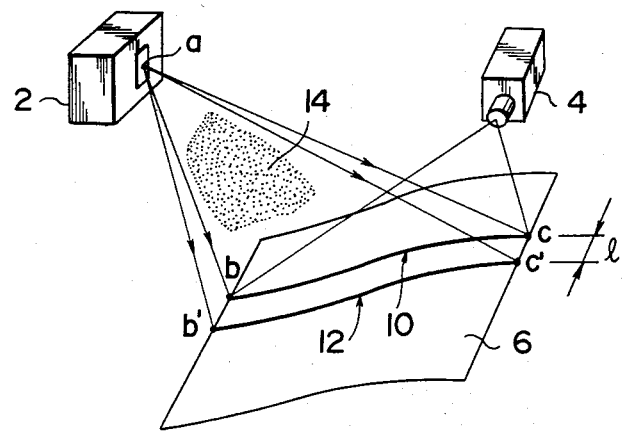
FIG. 2 is an explanatory view for explaining the principles of the present invention.

The principle of the present invention will be described hereinbelow by referring to FIGS. 2 through 6, inclusive. In the following description, it is to be understood that an explanation will be made upon such an example where a background picture due to scattering materials has been removed. As shown in FIG. 2, a projector 2 and an image pickup means 4 are arranged in accordance with a similar manner to that in a conventional light-section method. Then, either a certain plane a b c is scanned by means of light beam emitted from a point a in the projector 2, or belt-like light rays are irradiated onto such certain plane to illuminate a first line 10 to be determined being imagined on a plane 6 to be determined. Thereafter, the line 10 to be determined is picked up by the use of the image pickup means 4. A picture A obtained by such pickup of image signal is illustrated in FIG. 3. In this picture A, a first image 10' of line to be determined and a background picture 14' due to atmosphere of scattering materials 14 are picked up. And a picture signal corresponding to the picture A is signal-processed by means of a signal processing circuit 16 illustrated in FIG. 6 and which effects removal of high frequency wave, differential processing, and gain adjustment, and then the resulting signal is stored in a memory arithmetic circuit 18.

Succeedingly, the projector 2 is rotated with a prescribed angle in a horizontal plane to change a projecting light cut plane from the plane a b c to the one a b' c' as shown in FIG. 2, and light is irradiated on a second line 12 to be determined being imagined at a position with a prescribed distance l apart from the first line 10 to be determined in accordance with a similar manner to that mentioned above, whereby the second line 12 to be determined is picked up by means of the image pickup means 4. A picture B obtained by such pickup of image signal is illustrated in FIG. 4. In this picture B, a second image 12' of line to be determined and a background picture 14" due to atmosphere of scattering materials 14 are picked up. Then, a picture signal corresponding to the picture B is signal-processed by means of a signal processing circuit 20 for effecting removal of high frequency wave, differential processing, and gain adjustment similarly to those in the signal processing circuit 16 as illustrated in FIG. 6, and then the resulting signal is inputted into the memory arithmetic circuit 18. In the memory arithmetic circuit 18, the picture signal inputted from the signal processing circuit 20 is subtracted from the picture signal corresponding to the picture A which has already been stored, thereby to obtain a fresh picture signal. A picture C corresponding to this fresh picture signal is illustrated in FIG. 5. As is understood from the drawing, the background image has already been removed in FIG. 5 by means of the subtraction in the memory arithmetic circuit 18, thus only the first image 10' of line to be determined appears in FIG. 5. Moreover, it is to be noted that the second image 12' of line to be determined becomes a negative value by means of the subtraction so that the same does not appear in the picture C.

In addition, it is suitable that the distance l between the first and second lines to be determined is several times longer than a width of luminance line (a diameter of luminous spot in case of scanning by means of light beam). Further it is advantageous to improve SN ratio that writing operation in the case where a picture signal is stored in a memory arithmetic unit is repeated a number of times upon a series of video pictures obtained by scanning with light beam.

Next, an embodiment in which the present invention is applied to a profile determination of a charge at the top of a blast furnace will be described by referring to the accompanying drawings. As shown in FIGS. 7, a system of the present embodiment comprises a laser light source 22, a reflector 24 for reflecting laser beam from the laser light source 22 at an angle of 90°, a beam scanner 26 for scanning laser beam on a surface 30 of the charge at the furnace top, and a television camera 28 as its image pickup means. The first signal processing circuit 16 as well as the second signal processing circuit 20 connected in parallel to the first signal processing circuit 16 are connected with the television camera 28. The respective signal processing circuits 16 and 20 are connected to a scan converter 32 as its memory arithmetic circuit. The scan converter 32 is connected to a microcomputer 36 through a signal position detecting circuit 34. Furthermore it is arranged in such that an azimuth $\theta$ of the bean scanner 26 is inputted to the microcomputer 36.

As the scan converter 32, Scan Converter System Model 639 S (Trade name, manufactured by Hughes Co. in U.S.A.) was employed. This scan converter utilizes storage tubes, and a picture is stored in a storage target as charge pattern. Accordingly, addition and subtraction of the picture can be effected by controlling discharge and charge with respect to the respective points on the storage target.

Further the beam scanner 26 is composed of a reflector of substantially octangular prism having eight surfaces of reflection and is arranged in such a way that the angle of each surface of reflection changes by rotating the reflector around the axis thereof as its center. Accordingly, laser beam can be made to scan along the line to be determined on the surface 30 of the charge at the furnace top, when the beam scanner 26 is rotated. Moreover a rotational frequency controller 33 for controlling a rotational frequency of a beam scanner 32 is connected to the shaft of the beam scanner 32.

It is to be noted that the television camera 28 is utilized in such manner that the camera is rotated at an angle of 90° with respect to a usual arrangement of a television camera so that video scanning lines appear along the vertical direction of a picture.

Figure 8:
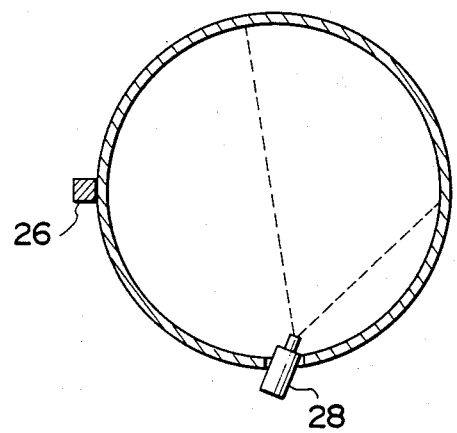
FIGS. 8 and 9 are front and elevational views each showing an arrangement of a beam scanner and a television camera in FIG. 7.
Figure 9:
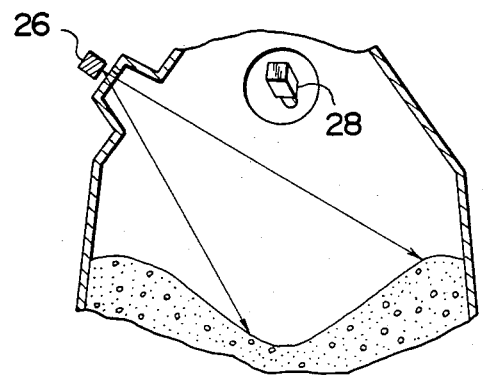

The beam scanner 26 and the television camera 28 are placed in the same horizontal plane at the positions where they are apart at an angle of 90° from each other as shown in FIGS. 8 and 9. In addition, the beam scanner 26 and the television camera 28 are positioned with a height of about 3000 mm from the highest position of the surface 30 of the charge at the furnace top.

In the following, operation of the present embodiment will be described by referring to the accompanying drawings.

Figure 10:
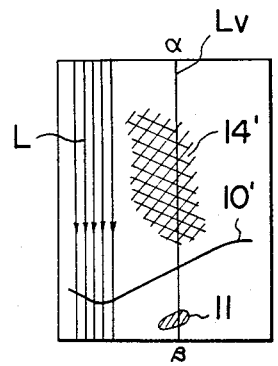
FIGS. 10 and 11 are diagrams illustrating picture A and picture B in the aforesaid embodiment of the present invention, respectively.

First, laser beam is irradiated from the laser light source 22 and reflected by means of the reflector 24 at an angle of 90° to irradiate the laser beam reflected upon a surface of reflection of the beam scanner 26. In this case, if a horizontal azimuth of the beam scanner 26 is present at $\theta$ and rotated with a prescribed rate, scanning is effected by means of the laser beam along the first line 10 to be determined being imagined on the surface 30 of charge at the furnace top. In this condition, the first line 10 to be determined is picked up by the use of the television camera 28 at the time when the first line 10 to be determined is subjected to at least one scanning. The picture A obtained by such pickup of image signal is illustrated in FIG. 10 in which the first image 10' of line to be determined, the background picture 14' due to scattering materials 14, and a high temperature luminous part image 11 derived from a core part of the furnace are picked up, respectively, and further reference character L designates video scanning lines, and $L_v$ a video scanning line at a specified position.

In this situation, a picture signal of the picture A outputted from the television camera 28 is processed by means of the signal processing circuit 16, and then when the video signal A being expressed by means of voltage V and time t on the video scanning line $L_v$ is extracted, the result is as illustrated in FIG. 12(a). In FIGS. 12(a), (b) and (c), reference character $\gamma$ corresponds to synchronizing signal, $\delta$ scattering image, $\omega_1$ laser locus image, and $\xi$ high temperature luminous part image, respectively.

Figure 11:
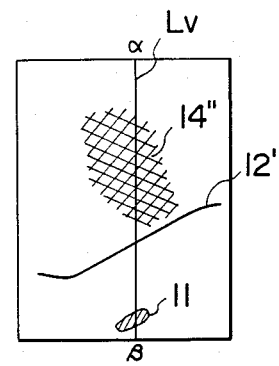

Next, the horizontal azimuth of the beam scanner 26 is set to a value of $\theta - \eta$, and scanning is carried out with laser beam along the second line 12 to be determined being imaged at the position with a prescribed distance apart from the first line 10 to be determined. In this case, the magnitude of an angle $\eta$ is dependent upon the diameter of a luminous spot image on the picture due to laser beam, and the most suitable is usually around 5°. And when the second line 12 to be determined is picked up by the use of the television camera 28, the picture B illustrated in FIG. 11 is obtained. In FIG. 11, reference numerals 12' and 14" designate the second image of line to be determined, and the background picture due to scattering materials, respectively. Furthermore when the video signal B on the video scanning line $L_v$ is extracted by the similar manner to that mentioned above, the result is as illustrated in FIG. 12(b) in which reference character $\omega_2$ designates laser locus image.

Figure 12:
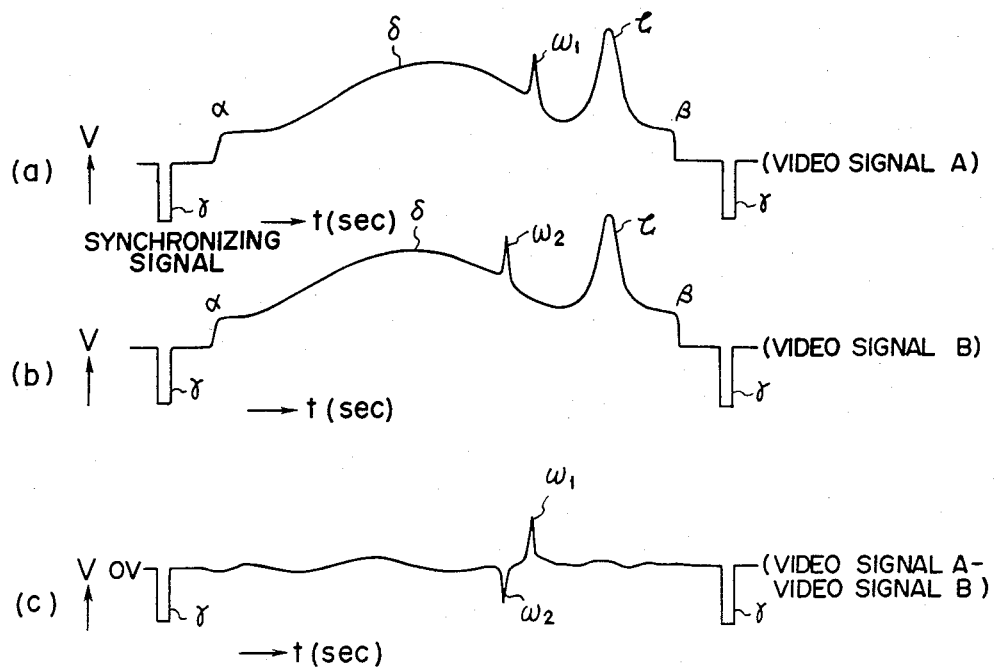
FIGS. 12(a), (b) and (c) are diagrams illustrating video signal A of picture A in FIG. 10, video signal B of picture B in FIG. 11, and a video signal obtained by subtracting video signal B from video signal A, respectively.

In this condition, when the video signal B is subtracted from the video signal A, a video signal illustrated in FIG. 12 (c) is obtained so that if the laser locus image $\omega_1$, for example, a mean value thereof is extracted, two-dimensional position coordinates (H, V) on the video signal $L_v$ can be obtained in the following signal position detecting circuit 34.

Meanwhile, if the above-mentioned processing is applied to all the video scanning lines L, two-dimensional position coordinates in the respective points of the first image of line to be determined on the picture A are obtained.

Moreover the subtraction of the video signal B from the above described video signal A is effected by controlling charge of the scan converter 32. On the other hand, there arises also such a case where the video signals A and B involve high frequency noises having different positions on the time t-axis, and signal strength of the laser locus images $\omega_1$ and $\omega_2$ is considerably smaller than that of the background. Accordingly, in the present embodiment, the signal processing circuits 16 and 20 pretreating separately the video signals A and B are provided as a measure to counter lowering of SN ratio of signal strength in the laser locus images so that differential effect and gain adjustment of the second signal processing circuit 20 are fixed at a small value as compared with those of the first signal processing circuit 16.

The two-dimensional position coordinates (H, V) obtained as described above are converted into three-dimensional position coordinates (X, Y, Z) of the respective points on the first line 10 to be determined on the surface 30 of charge at the furnace top by means of the microcomputer 36 in accordance with coordinate conversion by adopting horizontal azimuth $\theta$ of the beam scanner 26, azimuth of the television camera 28, and geometrical constants relating to mounting positions of the beam scanner 26 and the television camera 28.

Next, as illustrated in FIG. 13, for instance, nine first lines $P_1-P_9$ to be determined at intervals of 10° are imagined on the surface 30 of the charge in furnace, at the same time, second lines $q_1-q_2$ to be determined being positioned at 5° apart from the first lines $P_1-P_9$, respectively, are imagined, and when three-dimensional position coordinates at the respective points of the first line $P_1-P_9$ to be determined on the surface 30 of the charge in furnace are extracted and enveloping surface is extracted from the three-dimensional position coordinates are extracted, a shape of the surface 30 of charge in furnace can be obtained in accordance with the manner as described above.

In this connection, a ratio of picture data which could not have been detected or has erroneously been detected with repect to all the picture data was about 60% in a conventional light-section method, whilst it was improved in the ratio of about 40% in the present embodiment.

Then, the principle of the present invention will be described hereinbelow by referring to FIG. 2 and FIGS. 14 through 18, inclusive. In the following description, it is to be noted that an explanation will be made upon such an example where a background picture due to scattering materials has already been removed. As shown in FIG. 2, the projector 2 and the image pickup means 4 are arranged in accordance with a similar manner to that in a conventional light cut method. Thereafter, the certain plane a b c is scanned at a prescribed scanning rate by means of light beam emitted from the point a in the project 2 to illuminate the first line 10 to be determined being imagined on the plane 6 to be determined. As a result, continuous luminous spots appear on the first line 10 to be determined, and a series of pictures formed during a period in which a luminous spot passes through field of view of the image pickup means 4 are picked up by utilizing the pickup means 4 having a picture scanning period of T second so that a series of pictures $A_1, A_2, -A_n$ illustrated in FIGS. 14($a_1$) through 14($a_n$), inclusive, are obtained. In the respective pictures, light beam luuminous spot images $10_1', -10_n'$ as well as background pictures $14_1', -14_n'$ due to scattering materials 14 are picked up.

Figure 19:
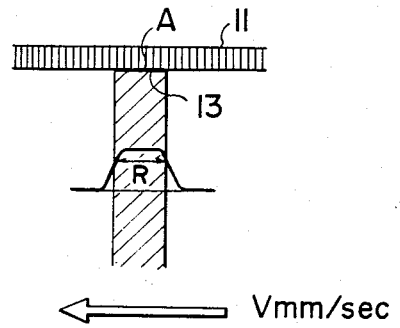
FIG. 19 is a diagram for explaining a relationship between a diameter of a laser luminous spot image and a rate of the laser beam passing through a picture.
Figure 20:
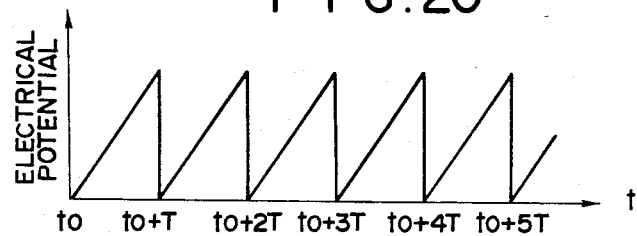
FIG. 20 is a diagram illustrating a relationship between a picture scanning period T and an electric potential.
Figure 21:
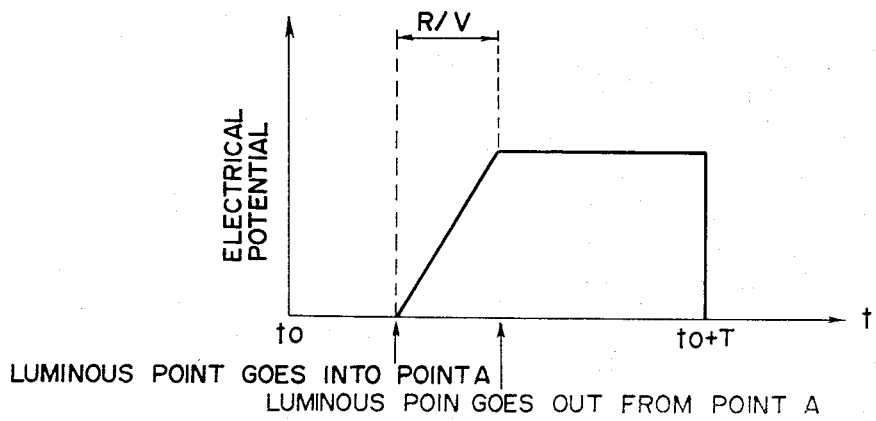
FIG. 21 is a diagram illustrating changes in electric potential of an arbitrary point A in case of $R/v < T$.

In the above case, since luminance of the light beam luminous spot on the plane to be determined is generally small, it is preferable to present a scanning rate of the light beam by which the first line 10 to be determined is scanned in such that it makes a quantity of the incident light struck upon the image pickup means maximum. In this case, if it is assumed that a rate of travel of the light beam luminous spot image on a picture is v mm/sec., a picture scanning period of the pickup means 4 is T sec., a diameter of the light beam luminous spot image on the picture is R mm, and resolution of the picture is made to be sufficiently smaller than the diameter R of the luminous spot image, a time required for which the light beam luminous spot image 13 passes through an arbitrary point A on the picture 11 illustrated in FIG. 19 becomes R/v sec. Further the pickup means 4 is the one for storing and keeping the light struck upon an arbitrary point on the picture as electric potential (or charge) the maximum T sec. Potential charge in the case where light of a constant intensity continues at striking upon the aforesaid arbitrary point is as illustrated in FIG. 20. Therefore, if scanning is effected by means of light beam so as to satisfy the following equation (1) as illustrated in FIG. 21, it can be picked up with the maximum quantity of incident light:

$$vT \leq R \tag{1}$$

Figure 18:
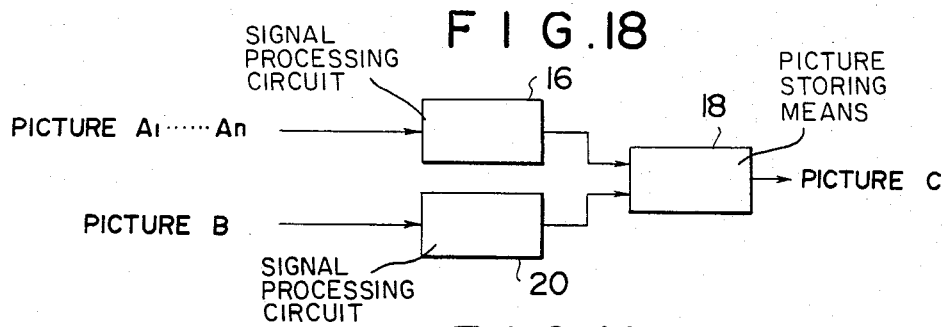
FIG. 18 is a block diagram showing a circuit for extracting picture C from pictures A and B in the aforesaid principle of the present invention.

A series of the pictures $A_1$, $A_2$,-$A_n$ are signal-processed by means of a first signal processing circuit 16 for effecting removal of high frequency wave, differential processing, and gain adjustment as shown in FIG. 18, and then the resulting pictures are stored in a picture storing means 18 in a overlapped manner. The picture A obtained by means of the picture storing means 18 is shown in FIG. 15. In the picture A, the first image 10' of line to be determined and the background picture 14' are picked up.

Then, the projector 2 is rotated with a prescribed angle in the horizontal plane to change a light cut plane for projecting light beam from the plane a b c to the one a b' c', and the second line 12 to be determined being imagined at a position with a prescribed distance l apart from the first line to be determined is scanned by means of light beam, a series of pictures $B_1$, $B_2$,-$B_n$ are picked up by the use of the pickup means 4 having a similar picture scanning period of T sec. to that mentioned above, the so picked up pictures are signal-processed by means of the second signal processing circuit 20, and then the respective pictures $B_1$, $B_2$,-$B_n$ are substracted from the picture A stored in the picture storing means 18. In this case, the picture B obtained by overlapping a series of the pictures $B_1$, $B_2$,-$B_n$ with each other is as illustrated in FIG. 16 in which the second image 12' of line to be determined and the background picture 14" are picked up, respectively. Moreover the picture C obtained by subtracting a series of the pictures $B_1$, $B_2$,-$B_n$ from the picture A (as a natureal consequence, the picture obtained by subtracting the picture B from the picture A) becomes the one as illustrated in FIG. 17 in which the background picture is removed, and a good quality of the picture having a high SN ratio is obtained.

It is suitable that the prescribed distance l between the aforesaid first and second lines 10 and 12 to be determined is arranged, as mentioned above, in such a way that the distance between the first and second images 10' and 12' of lines to be determined is several times longer than a width of each image.

On one hand, an object of the picture B in which the second line 12 to be determined has been picked up is not to pick up the second image of line to be determined, but to remove the background picture 14' of the picture A and a passive spot image, and accordingly it is sufficient for attaining such object that the whole image has been picked up in one picture. Therefore, it is arranged in such that picking-up of image signal is effected by means of scanning so as to become a transit time t of the liminous spot image passing through the picture on the surface thereof equal to or shorter than a picture scanning period T, and the resulting picture is amplified n times, that is, subtraction is effected after making level of the resulting picture to be the same level of the background picture and the passive spot image in the picture A, so that the scanning period can be shortened.

Two-dimensional position coordinates of the first image of line to be determined on the picture C obtained as described above are extracted and when the result is subjected to coordinate conversion, three-dimensional position coordinates of the first line to be determined can be obtained.

Next, in the case when the present invention is applied to determination of a profile of the charge at furnace top, the above-mentioned system shown in FIGS. 7-9 is utilized.

In the following, operation of an embodiment of the present invention will be described hereinbelow by referring to the accompanying drawings.

First, laser beam is irradiated from the laser light source 22 and the laser beam is reflected at an angle 90° by means of the reflector 24 to irradiate the reflected laser beam onto a surface of reflection of the beam scanner 26. In this case, a horizontal azimuth of the beam scanner 26 is preset at $\theta$ and at the same time, a rotational frequency of the beam scanner 26 is controlled by means of a rotational frequency controller 33, whereby scanning is effected by means of laser beam along the first line 10 to be determined at such a rate of scanning in which a quantity of incident light becomes maximum, and in this situation the first line 10 to be determined is picked up by the use of the television camera 28. In the present embodiment, the scanning was carried out in such a way that a time required for transferring a luminous spot image from one end to the other end of a picture came to be about 6 seconds, and such image signal was picked up by utilizing a television camera having a picture scanning time T of 1/30 second. Thus, a number of pictures picked up during a period where one scanning of the first line 10 to be determined was effected was about 200 sheets. A series of pictures consisting of such number of pictures of about 200 sheets were processed by means of the first signal processing means 16, then the pictures thus processed were stored in the scan converter 24 in overlapped manner, and as a result, a similar picture to that of FIG. 15 was obtained.

Next, the horizontal azimuth of the beam scanner 26 is set to a value of $\theta - \alpha$, and scanning is carried out with laser beam along the second line 12 to be determined being imagined at the position with a prescribed distance apart from the first line 10 to be determined. In this case, the magnitude of an angle $\alpha$ is dependent upon the diameter of a luminous spot image on the picture due to laser beam, but the most suitable is usually around 5°, and a scanning rate of the second line 12 to be determined is made to be larger than that of the first line 10 to be determined.

Then, the second line 12 to be determined is picked up by the use of the television camera 28, the image signal picked up is signal-processed by employing the signal processing circuit 20 having a prescribed gain constant, and thereafter a picture of the output from the second signal processing circuit 20 is subtracted from the picture stored in the scan converter 32. The resulting picture is similar to that illustrated in FIG. 17 in which the background picture and the luminous part image are removed, and two-dimensional position coordinates (H, V) in the respective points of the first image of line to be determined can be obtained from such picture.

The two-dimensional position coordinates (H, V) obtained as mentioned above are similarly processed in accordance with the manner as described above by means of the microcomputer 36 so that a shape of the surface 30 of charge in furnace is obtained.

In this connection, a ratio of picture data which could not have been detected or has erroneously been detected with respect to all the picture data was about 60% in a conventional light cut method, whilst it was improved in the ratio of about 20% in the present embodiment.

Further it is to be noted that the explanation has been made upon such an example in which a picture signal is subtracted by the use of the scan converter in the above description, but such subtraction treatment may be carried out as mentioned hereinbelow by utilizing digital memories and a microcomputer. Namely, the treatment is carried out in such a way that picture signals pretreated are separately stored in the respective digital memories, and data of address corresponding to the same video scanning lines are read from both the digital memories, thereby to effect the subtraction. A specific example of the digital memories includes Video Frame Memory VMF-1 (Trade name, manufactured by Toko K.K.).

Figure 22:
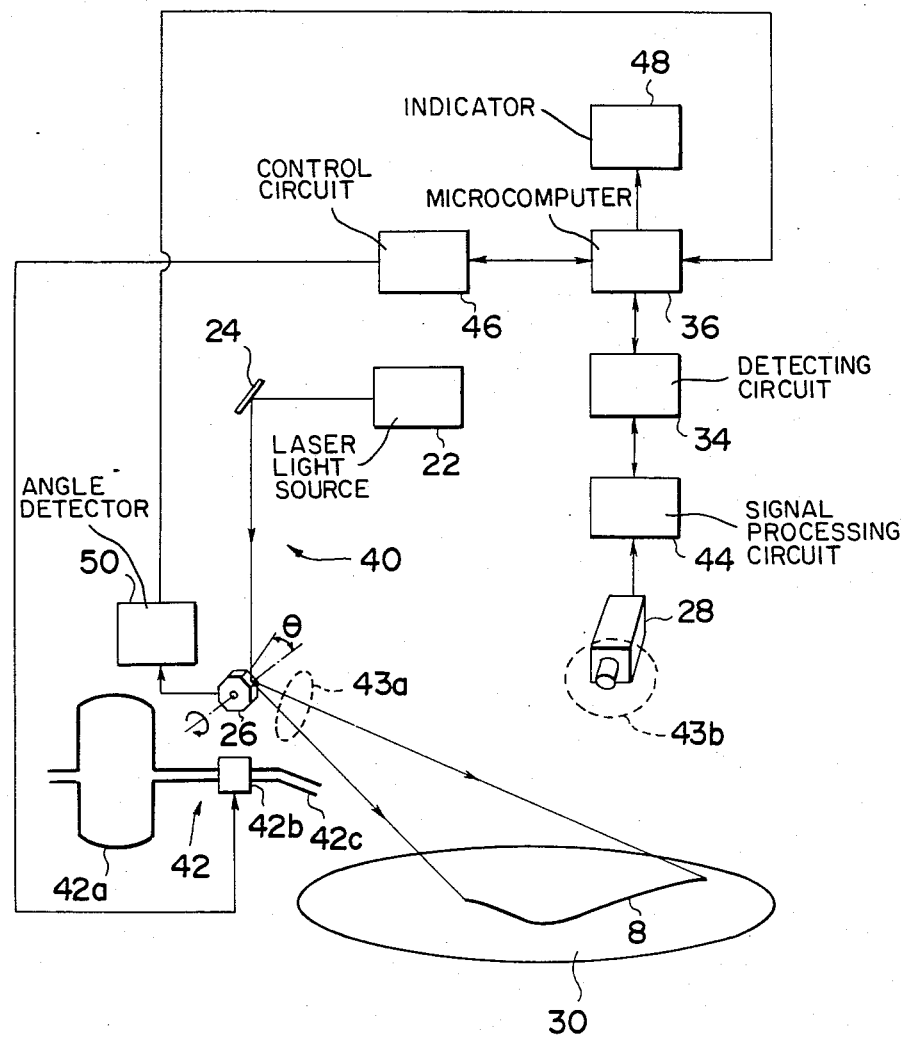
FIG. 22 is a block diagram illustrating an embodiment of the present invention.

In the following, embodiments of the present invention will be described in detail by referring to the accompanying drawings. An embodiment of the system according to the present invention is shown in FIG. 22 is which the system comprises a projector 40 for projecting laser beam upon line 8 to be determined being imagined on a surface 30 of charge as a surface to be determined in atmosphere of scattering materials; a television camera 28 as a pickup means in which line 8 to be determined is picked up, and the picture signal is outputted therefrom; and a gas jetting means 42 for jetting gas having a higher pressure than the pressure of the atmosphere of scattering materials into the atmosphere. The projector 40 is composed of a laser light source 22, a reflector 34, and a beam scanner 26 disposed on the outside of a projection window 43a provided in a furnace wall. In this construction, laser beam emitted from the laser light source 22 is reflected by the reflector 24 in a direction of the surface of reflection of the beam scanner 26, and scanning with the laser beam is effected along the line 8 to be determined by means of the beam scanner 8.

The television camera 28 is placed on the outside of a projection window 43b provided on the furnace wall in the top portion of the furnace top in such that the line 8 to be determined comes within the range of the television camera. A signal processing circuit 44 for effecting removal of high frequency, differential processing, and gain adjustment with respect to the picture signal outputted from the television camera 28 is connected with the television camera 28, and further a position coordinate detection circuit 34 for detecting two-dimensional position coordinates (H, V) of an image of line to be determined on the picture picked up is connected with the signal processing circuit 44. Moreover a microcomputer as an arithmetic unit for operating three-dimensional position coordinates (X, Y, Z) of the line 8 to be determined on the surface 30 of charge in a furnace from the two-dimensional coordinates (H, V) being the output of the position coordinate detection circuit 34 by means of coordinate conversion is connected with th position coordinate detection circuit 34. Besides an indicator 48 for displaying the three-dimensional position coordinates (X, Y, Z) is connected to the microcomputer 36.

The gas jetting means 42 consists of a gas holder 42a for storing dust-free blast furnace exhaust gas, solenoid valve 42b connected to the gas holder 42a through a gas passage, and a nozzle 42 provided on the extreme end of the solenoid valve 42b. And the solenoid valve 42b is switched and controlled by means of a control circuit 46 for controlling wake-up of the microcomputer 36.

Furthermore an angle detecting means 50 for detecting a horizontal azimuth $\theta$ of a shaft of the beam scanner 26 is connected with the beam scanner 26 in such manner that output of the angle detecting means 50 is inputted to the microcomputer 36.

Next, operation of the present embodiment will be described hereinbelow by referring to FIG. 22. Laser beam emitted from the laser light source 22 is reflected by means of the reflector 24 in a direction along that of the beam scanner 26. In this case, if the horizontal azimuth of the shaft of the beam scanner 26 is preset at $\theta$ and the beam scanner 26 is rotated, scanning is effected by emitting laser beam on the line 8 to be determined through the projection window 43a. In this case, scanning with the laser beam is effected within a perpendicular plane, and a horizontal azimuth $\theta$ in the perpendicular plane, i.e., the horizontal azimuth $\theta$ of the beam scanner 26 is detected by the angle detecting means 50. Due to this scanning with laser beam, continuous luminous spots appear on the line 8 to be determined.

These continuous luminous spots are picked up by the television camera 28, but it is to be noted that in case of such picking up of luminous spots, a solenoid valve controlling signal is outputted from the control means 46 immediately before the picking up (before about 3 seconds), whereby the solenoid valve 42 is turned ON from OFF state. It results in jetting of blast furnace exhaust gas into atmosphere in the furnace where scattering materials float through the nozzle 42c. In this case, a pressure of the exhaust gas in the gas holder 42 is fixed at a 2-5 times higher value than the pressure in a furnace having usually a pressure of 1.7 atm. Further a diameter of the nozzle 42c is 1-2 inches. Moreover it has been found that dust purge effect in the diametrical direction of a blast furnace is remarkable with respect to such blast furnace having an average dust concentration of 20 g/N m$^3$, a means gas velocity of 1.2 m/sec., and an inner diameter of 7 m, respectively, in the case where a nozzle with a diameter of 1-2 inches is employed, and a pressure of the gas holder is made to be about 3 times higher than the pressure in the blast furnace. Exhaust gas jetting is directed to the vicinity of optical path of laser beam so that a dust concentration in the vicinity of the optical path is permitted to decrease. As a result of jetting exhaust gas under the aforesaid condition, its average dust concentration could be reduced to about $\frac{1}{3}$.

As described above, exhaust gas is jetted into the atmosphere in a furnace, and then picking up of image signal is carried out for about 1 second by utilizing the television camera 28. Then, control signal is outputted from the control means 46 upon the solenoid valve 42 at the time when the picking up by means of the television camera 28 was finished, whereby the solenoid valve 42 comes to be closed state, and the exhaust gas jetting is stopped. A picture signal obtained by the television camera 28 is signal-processed by means of the signal processing circuit 44, and then the signal thus processed is inputted to the position coordinate detection circuit 34. In the position coordinate detection circuit 34, two-dimensional position coordinates (H, V) on the television picture of an image of line to be determined are detected from the picture signal obtained. The two-dimensional position coordinates (H, V) obtained are inputted to the microcomputer 36. In the microcomputer 36, three-dimensional position coordinates (X, Y, Z) with respect to the respective points of the line 8 to be determined on the surface 30 of charge in the furnace are operated by means of coordinate conversion from the two-dimensional position coordinates (H, V), the horizontal azimuth $\theta$ of the beam scanner 26 inputted from the angle detecting means 50, and a geometrical configuration constant which has previously been set in the microcomputer 36 in respect of the beam scanner 26 and the television camera 28. As the result, the three-dimensional position coordinates (X, Y, Z) obtained is indicated in the indicator 48.

In this connection, each azimuth of the beam scanner 26 is varied with, for instance, every 5 degrees and a number of lines to be determined being imaged on the surface 30 of charge in the furnace are determined as mentioned above, and when an enveloping surface of the resulting three-dimensional position coordinates is extracted, a shape of the surface of charge in the furnace can be obtained. It is preferable that the nozzle 42 is swung so as to conform the horizontal azimuth of the beam scanner 26 by the use of a driving means.

Figure 23:
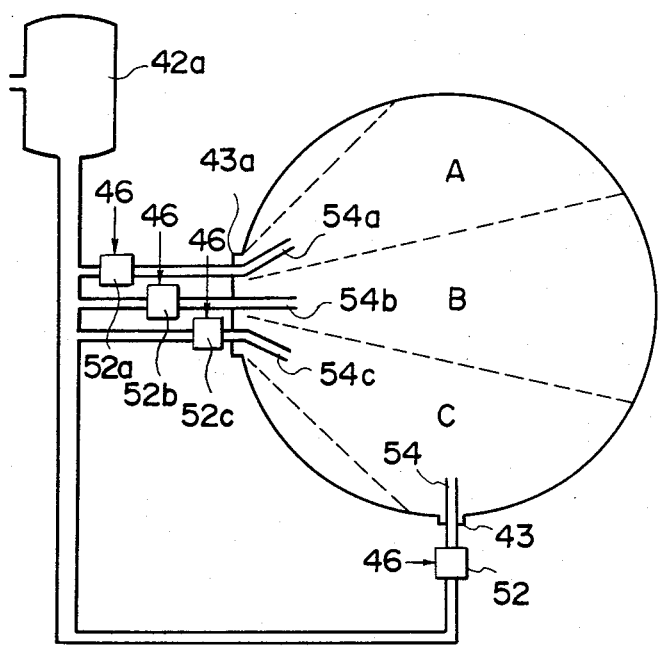
FIG. 23 is a block diagram illustrating another embodiment of the present invention.

Next, another embodiment of the present invention will be illustrated in FIG. 23 in which the surface of charge in a furnace is divided into three regions, A, B, and C to be determined, nozzles 54a, 54b and 54c are disposed so as to correspond to the respective regions to be determined, and at the same time a nozzle 54 for cleaning away scattering materials on a pickup passage is provided immediately below a light receiving window 43. As shown in FIG. 23, the present embodiment comprises four solenoid valves 52, 52a, 52b and 52c connected to a gas holder 42a through a gas passage, respectively, and the nozzles 54, 54a, 54b and 54c connected to the respective solenoid valves. The respective solenoid valves are switched by means of control signals supplied from a control means 46. The nozzles 54a, 54b and 54c are arranged so as to direct the regions A, B and C to be determined, respectively, whilst the nozzle 54 is arranged so as to direct to the pickup direction. The present embodiment is practiced in such that first, the solenoid valves 52 and 52a are made to open, thereby to jet exhaust gas from the nozzles 54 and 54a, and image signal is picked up in the case where the region A is determined. In the same manner, exhaust gas is jetted from the nozzles 54 and 54b in the case where the region B is determined, whilst exhaust gas is jetted from the nozzles 54 and 54c in the case where the region C is determined, and then both the regions B and C are determined through picking up of image signal, respectively. According to the present embodiment, since scattering materials in the pickup passage are cleared away, there is such an advantage in that a favorable determination can be effected even in a case where light scattering due to dust in the passage is remarkable.

In this connection, according to the aforesaid embodiment, a ratio as to the case where determination was possible immediately after 30 seconds or less from charging of a raw material into a furnace was conventionally 60%, whilst such ratio was improved to a value of 90% in the present embodiment.

In addition, in such a case where a line to be determined is picked up by the use of a television camera, it is practiced in such that a second line to be determined is imaged in the vicinity of the (first) line to be determined as in the first and second inventions mentioned above to extract two pictures, subtraction is effected between these pictures, and two-dimensional position coordinates are extracted on the basis of the pictures obtained, so that a passive spot image derived from a furnace core luminous part or the like can be removed. In such a case, the system as illustrated in FIG. 7 is utilized.

What is claimed is:

1. A method for determining the shape of a surface to be determined in an atmosphere of scattering materials comprising:
    irradiating light on a first line to be determined being imaged on said surface to be determined in the atmosphere of scattering materials to extract a first picture signal at the time of picking up said first line;
    irradiating light on a second line on said surface to be determined being imaged at a position on a prescribed distance apart from said first line to extract a second picture signal at the time of picking up said second line;
    substracting said second picture signal from said first picture signal to extract a fresh picture signal; and
    applying said fresh picture signal to the two-dimensional position coordinates of a first image of said first line in the first picture signal to extract three-dimensional position coordinates of said first line on said surface to be determined through coordinate conversion of said two-dimensional position coordinates.

2. A method for determining the shape of a surface to be determined in an atmosphere of scattering materials comprising:
    scanning with a laser beam along a first line to be determined being imaged on said surface to be determined in the atmosphere of scattering materials to extract a first picture signal through picking up of said first line by a television camera;
    scanning with a laser beam along a second line to be determined being imaged at a position on said surface to be determined a prescribed distance apart from said first line to extract a second picture signal through picking up of said second line by said television camera;
    subtracting a portion of said second picture signal corresponding to the intersection of a specified scanning line and the image of said second line in said second picture signal from a portion of said first picture signal corresponding to the intersection of said scanning line and the image of said first line in said first picture signal to extract a fresh video signal;
    extracting the two-dimensional position coordinates of said point of intersection of the image of said first line with said scanning line from a signal corresponding to a laser locus image on said scanning line in said fresh video signal;
    repeating the previous two steps for each scanning line in said first picture signal to extract the two-dimensional position coordinates of the respective points of the image of said first line; and
    extracting three-dimensional position coordinates of said first line on said surface to be determined by subjecting said two-dimensional position coordinates of the respective points of the image of said first line to coordinate conversion.

3. The method for determining the shape of a surface to be determined in an atmosphere of scattering materials of claim 2, further comprising:
    jetting gas of a higher pressure than that of said atmosphere of scattering materials thereinto prior to extracting said first picture signal and said second picture signal.

4. A system for determining the shape of a surface to be determined in an atmosphere of scattering materials comprising:

projector means for projecting light upon a first line to be determined being imagined on the surface to be determined in the atmosphere of scattering materials and upon a second line on said surface to be determined a prescribed distance apart from said first line;

gas jetting means for jetting gas of a higher pressure than the pressure of said atmosphere of scattering materials thereinto;

pickup means for picking up said first and second lines after jetting said gas by means of said gas jetting means, thereby to output a picture signal;

position coordinate detecting means for extracting two-dimensional position coordinates of said first line on a picture from said picture signal by comparing the signal corresponding to said first line with a signal representative of the difference between the picture signals corresponding to said first and said second lines; and arithmetic unit means for generating three-dimensional position coordinates of said first line on said surface to be determined by subjecting said two-dimensional position coordinates to coordinate conversion.

5. The system for determining the shape of a surface to be determined in an atmosphere of scattering materials of claim 4 wherein said gas jetting means comprises:
a gas holder for storing dust-free gas;
a solenoid valve connected to said gas holder and operating to open and close a gas passage; and
a nozzle connected to said solenoid valve and operating to jet said dust-free gas into said atmosphere of scattering materials.

6. The system for determining the shape of a surface to be determined in an atmosphere of scattering materials of claim 4, wherein said gas jetting means comprises a plurality of gas jetting means corresponding to determination regions defined by plurally dividing said surface to be determined, and another gas jetting means disposed in the vicinity of said pickup means for clearing away said scattering materials on the pickup passage.

7. A system for determining the shape of a surface to be determined in an atmosphere of scattering materials comprising:

laser beam scanning means for scanning a first line being imagined on said surface to be determined in the atmosphere of scattering materials and a second line on said surface to be determined being imagined at a position a prescribed distance apart from said first line by said laser beam scanning means at a prescribed scanning rate;

pickup means for picking up said first line and said second line to poutput a first picture signal representative of said first line and a second picture signal representative of said second line; signal processing means for removing high frequencies from said signals, distinguishing between said signals, and adjusting the relative amplitudes of said signals;

picture signal substracting means for subtracting said second picture signal from said first picture signal to extract a fresh picture signal after said first and second signals have been processed by said signal processing means;

position coordinate detecting means for extracting two-dimensional position coordinates of an image of said first line on the picture on the basis of said fresh picture signal; and an arithmetic unit means for subjecting said two-dimensional position coordinates to coordinate conversion by utilizing geometrical constants including the mounting position coordinates of said laser beam scanning means and said pickup means to extract three-dimensional position coordinates of said first line to be determined, thereby to obtain the shape of said surface to be determined.

8. The system for determining the shape of a surface to be determined in an atmosphere of scattering materials of claim 7, further comprising:
gas jetting means for jetting gas of a higher pressure than that of said atmosphere of scattering materials thereinto prior to effecting scanning with said laser beam scanning means.

* * * * *